United States Patent
Iwama

(10) Patent No.: US 7,069,128 B2
(45) Date of Patent: Jun. 27, 2006

(54) PARKING-ASSIST SYSTEM USING IMAGE INFORMATION FROM AN IMAGING CAMERA AND DISTANCE INFORMATION FROM AN INFRARED LASER CAMERA

(75) Inventor: Takaaki Iwama, Bunkyo-ku (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 11/225,214

(22) Filed: Sep. 14, 2005

(65) Prior Publication Data

US 2006/0069478 A1    Mar. 30, 2006

(30) Foreign Application Priority Data

Sep. 30, 2004   (JP) .............................. 2004-288108

(51) Int. Cl.
*G06F 7/00* (2006.01)

(52) U.S. Cl. ................. 701/36; 701/300; 340/932.2; 340/937; 348/142; 348/148

(58) Field of Classification Search ................ 701/1, 701/23, 36, 41, 122, 300, 301, 302; 348/142–151; 340/932.2, 937; 180/199, 204

See application file for complete search history.

(56) References Cited

U.S. PATENT DOCUMENTS

| 6,424,895 B1 | 7/2002 | Shimizu et al. | |
|---|---|---|---|
| 6,593,960 B1 * | 7/2003 | Sugimoto et al. | 348/148 |
| 6,898,495 B1 * | 5/2005 | Tanaka et al. | 701/36 |
| 6,919,822 B1 * | 7/2005 | Tanaka et al. | 340/932.2 |
| 6,925,370 B1 * | 8/2005 | Smith et al. | 701/36 |
| 6,929,082 B1 * | 8/2005 | Kataoka et al. | 180/204 |
| 6,940,423 B1 * | 9/2005 | Takagi et al. | 340/932.2 |
| 6,946,937 B1 * | 9/2005 | Donce | 335/282 |

FOREIGN PATENT DOCUMENTS

| EP | 1 148 461 A | 10/2001 |
|---|---|---|
| EP | 1 253 065 A | 10/2002 |
| JP | A 11-334470 | 12/1999 |
| JP | A 2003-205806 | 7/2003 |

* cited by examiner

*Primary Examiner*—Richard M. Camby
(74) *Attorney, Agent, or Firm*—Oliff & Berridge, PLC

(57) ABSTRACT

A parking-assist system for providing parking-assist information, including: a front imaging camera (2-6); a left imaging camera (4-6); a right imaging camera (5-6); a rear imaging camera (3-6); a left infrared laser camera (4-7) configured to obtain information on a distance as to the left side on a pixel to pixel basis; a right infrared laser camera (5-7) configured to obtain information on a distance as to the right side on a pixel to pixel basis; a rear infrared laser camera (3-7) configured to obtain information on a distance as to the rear side on a pixel to pixel basis; and a signal processing portion (13), wherein the parking-assist system provides the parking-assist information according to the information on the images from the imaging cameras (6) and the information on the distances as to each pixel from the infrared laser cameras (7).

15 Claims, 14 Drawing Sheets

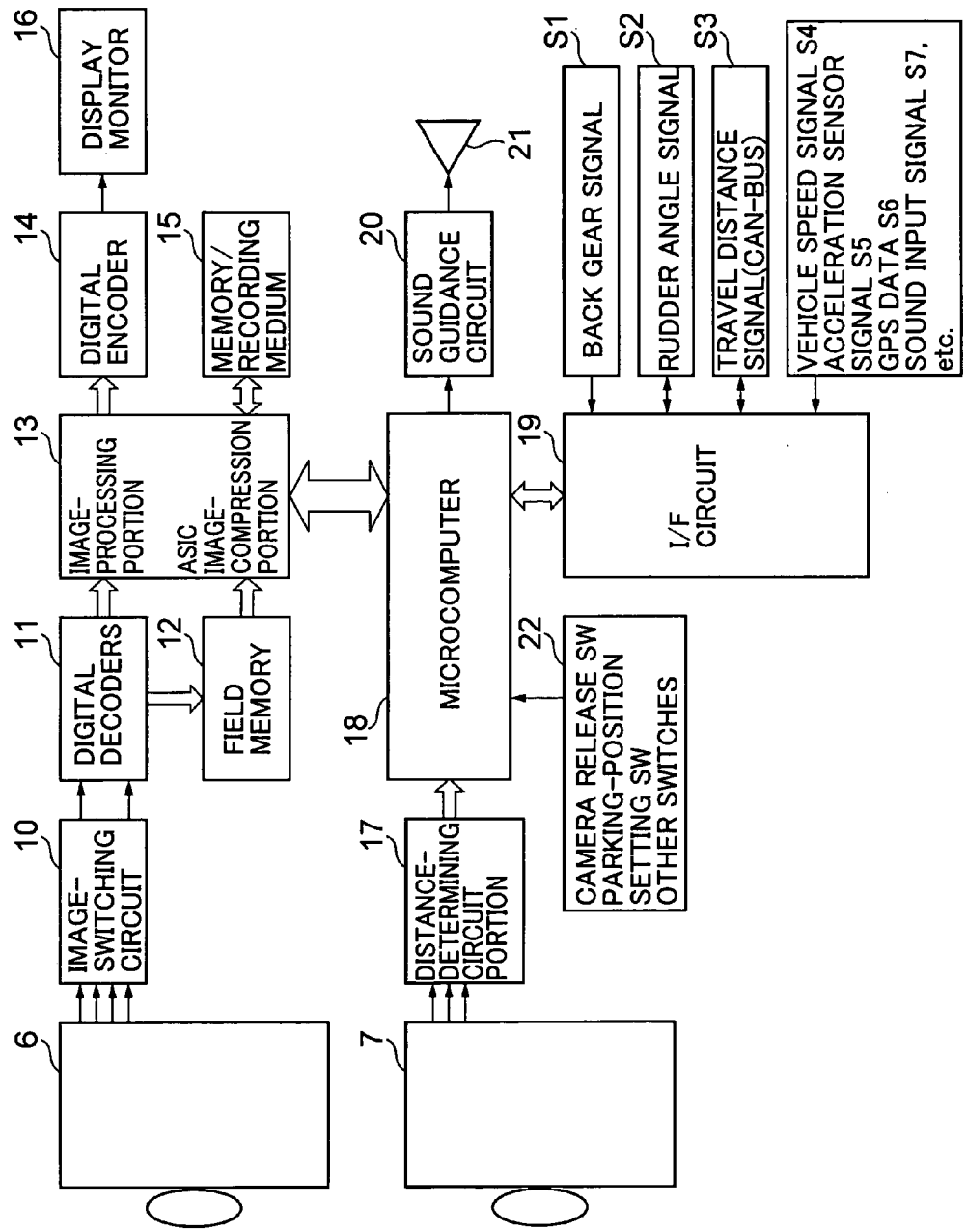

PARKING-ASSIST SYSTEM USING IMAGE INFORMATION FROM AN IMAGING CAMERA AND DISTANCE INFORMATION FROM AN INFRARED LASER CAMERA

BACKGROUND

1. Field of the Invention

The present invention relates to a parking-assist system capable of automatically performing a search for a parking position.

2. Description of Related Art

In Japan Patent Application Laid-open No. 11-334470 (Reference 1) there is disclosed a parking-assist apparatus which calculates an calculated passing route according to a steering angle (rudder angle) and displays on a screen the calculated passing route superimposed onto an image of rear of a car imaged by a rear camera, so that a driver can carry out a steering operation, recognizing the relationship between a parking position (a position where the car is to be parked) and a present position of the car by seeing a display marker on the screen.

In Japanese Patent Application Laid-open No. 2003-205806 (Reference 2), there is disclosed a parking-assist apparatus for assisting parking operation, mainly for assisting in putting a car into a garage. This parking-assist apparatus sets a target parking position when the car reaches a ready-to-park position (a position where the car temporarily stops to be parked), then calculates a moving distance and a rudder angle according to the target parking position and the ready-for-parking position, and thereby assists a parking operation.

With the apparatus disclosed in the reference 1, a driver should set the target parking position by adjusting the calculated passing route to the target parking position with a display marker, checking an image of rear of the car obtained by the rear camera. Thus, there exists a disadvantage of causing trouble, that is, the driver has to set a target parking position every time he parks the car. The apparatus disclosed in the reference 2 includes a similar problem.

Further, since a steering operation for parking is complicated practically, the guide for a parking operation is restricted within a certain level if a driver needs to check the calculated passing route on the screen. Also, operational safety should be taken into consideration.

SUMMARY

The present invention has been made in consideration of above mentioned actualities, thus one object of the invention is to provide a parking-assist system capable of providing parking-assist information (information for assisting a driver in parking) by automatically calculating a parking position.

According to one feature of the present invention, a parking-assist system for providing parking-assist information includes: a first imaging camera configured to image a front side of a vehicle; a second imaging camera configured to image a left side of the vehicle; a third imaging camera configured to image a right side of the vehicle; a fourth imaging camera configured to image a rear side of the vehicle; a first infrared laser camera configured to obtain information on a distance as to the left side of the vehicle on a pixel to pixel basis; a second infrared laser camera configured to obtain information on a distance as to the right side of the vehicle on a pixel to pixel basis; a third infrared laser camera configured to obtain information on a distance as to the rear side of the vehicle on a pixel to pixel basis; and a signal processing portion to which information on images from one or more of the imaging cameras and the information on the distances from one or more of the infrared laser cameras are inputted; wherein the parking-assist system provides the parking-assist information according to the information on the images from the one or more of the imaging cameras and the information on the distances as to each pixel from the one or more of the infrared laser cameras.

These and other objects, features and advantages of the invention will be appreciated upon reading of the description of the invention when in conjunction with the attached drawings, with the understanding that some modifications, variations and changes of the invention could be easily made by the skilled person in the art to which the invention pertains without departing from the spirit of the invention or the scope of the claims.

The present application is based on, and claims priority from, Japanese Patent Application No. 2004-288108, filed on Sep. 30, 2004, the contents of which are hereby incorporated by reference herein in its entirety.

BRIEF DESCRIPTION OF THE DRAWINGS

For a better understanding of the invention, reference is made to the attached drawings, wherein:

FIG. 3 is a block diagram schematically showing a circuit of a parking-assist system according to one embodiment of the present invention.

DETAILED DESCRIPTION OF THE PREFERRED EMBODIMENTS

Hereinafter one embodiment of a parking-assist system according to the present invention will be described, referring to accompanied drawings.

Figure 1:
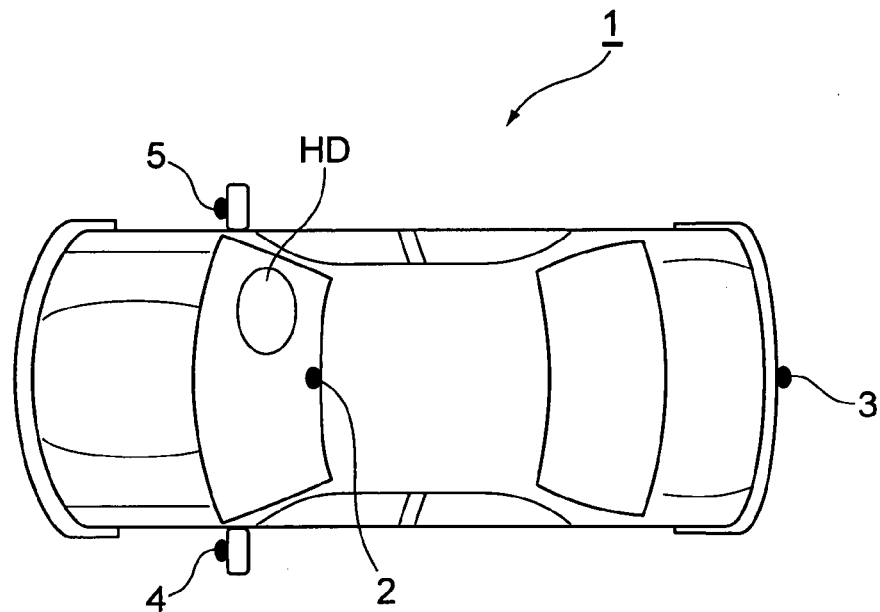
FIG. 1 is a top view showing a vehicle employing a parking-assist system according to one embodiment of the present invention.

FIG. 1 is a view showing a vehicle employing a parking-assist system according to one embodiment of the present invention. In FIG. 1, the numeral "1" indicates a vehicle. The vehicle 1 is provided with a front camera unit 2 for taking an image anterior to the vehicle 1, a rear camera unit 3 for taking an image posterior to the vehicle 1, a left side camera unit 4 for taking a left-rear image of the vehicle 1 and a right side camera unit 5 for taking a right rear image of the vehicle 1.

The each camera unit may be attached to a position at which the each camera can image each allocated region thereof. In this embodiment, however, the front camera unit 2 is attached to a upper position in an occupant room and located at a center in a lateral direction of the vehicle, the rear camera unit 3 is attached to a rear portion of the vehicle and located in a longitudinal direction of the vehicle, and side camera units 4, 5 are respectively attached to side mirrors of the vehicle.

Figure 2:
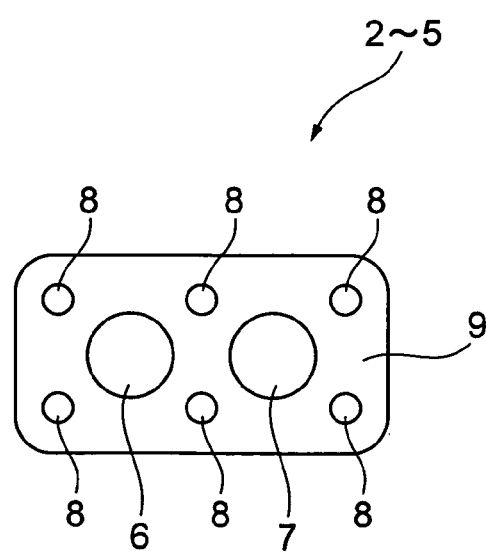
FIG. 2 is a front view showing one of camera units illustrated in FIG. 1.

As shown in FIG. 2, the each camera unit (2-5) is provided mainly with a popular color camera (imaging camera) 6 as appears on market, an infrared laser camera 7 and infrared laser emitting devices 8. That is, the front camera unit 2 includes the (first) imaging camera 6 and the infrared laser camera 7. The rear camera unit 3 includes the (fourth) imaging camera 6 and the (third) infrared laser camera 7. The left side camera unit 4 includes the (second) imaging camera 6 and the (first) infrared laser camera 7. The right side camera unit 5 includes the (third) imaging camera 6 and the (second) infrared laser camera 7. The infrared laser emitting devices 8 are attached to a front panel 9 of a housing of the each camera unit. Specifically in this embodiment, six infrared laser emitting devices 8 are disposed laterally and vertically, forming intervals therebetween.

The infrared laser camera 7 is employed for measuring a distance to an object on a pixel to pixel basis. An infrared camera may be employed in the each camera unit instead of the infrared laser camera 7. Although the infrared laser emitting devices 8 are attached to the front panel 9 in this embodiment, the position to which the infrared laser emitting devices 8 attached is not limited to the front panel 9.

As the infrared laser camera 7, one having an optical filter is employed for preventing disturbance caused by sunshine. Both the color camera 6 and the infrared laser camera 7 are used here, however, information on an image (image information) and information on a distance (distance information) can be obtained only by the infrared laser camera 7.

A parking-assist system shown in FIG. 3 is mounted on the vehicle 1. The parking-assist system is provided with an image-switching circuit 10, two digital decoders 11, a field memory 12, an image-processing portion 13, a digital encoder 14, a memory/recording medium 15, a display monitor 16, a distance-determining circuit portion 17, a microcomputer 18, an interface circuit (I/F circuit) 19, a sound guidance circuit 20, a speaker 21, and switches 22 such as a camera release switch, a parking-position setting switch and the like.

Image signals from the each color camera 6 are inputted to the digital decoder 11 via the image-switching circuit 10. The digital decoder 11 digitally decodes image information, and the digitally-decoded image information is directly inputted to the image processing portion 13 and is inputted to the image processing portion 13 through the field memory 12.

The image information directly inputted to the image processing portion 13 is encoded by the digital encoder 14 and then is image-displayed on the display monitor 16. In the case where images obtained by two cameras (the left side camera and the rear camera) are combined and displayed (See FIG. 5B), image information from the cameras is digitally-decoded and inputted to the image processing portion 13 via the field memory 12, and the digitally-decoded signals to be used are image-compressed and are recorded onto the memory/recording medium 15.

Information from the each infrared laser camera 7 is inputted to the distance-determining circuit portion 17, and distance information from the distance-determining circuit portion 17 is inputted to the microcomputer 18. The microcomputer 18 is operated with switches 22, e.g. the camera release switch, the parking-position setting switch, etc. The parking-position setting switch is used for setting a target parking position by way of an automatic determining-operation or a manual operation.

Signals such as a back gear signal S1, a rudder angle signal S2 of a steering wheel, a travel distance signal S3, a vehicle speed signal S4, an acceleration sensor signal S5 from an acceleration sensor, GPS data S6 and a sound input signal S7 are inputted to the microcomputer 18 via the interface circuit 19. The microcomputer 18 outputs a sound guidance signal to the sound guidance circuit 20 if required, and the sound guidance signal is inputted to the speaker 21. In this embodiment, the microcomputer 18 and the image-processing portion 13 constitute a signal processing portion, and image information, control information, etc. are transferred between the microcomputer 18 and the image-processing portion 13.

The distance-determining circuit portion 17 measures a reflex time how long infrared laser light takes to be reflected by an object and to return to the infrared laser emitting devices 8, counted from it is emitted. Thereby, the distance-determining circuit portion 17 calculates a distance from the infrared laser camera 7 to the object on a pixel to pixel basis. The distance information is three-dimensionally measured, thus, a shape of an object such as a vehicle, a bicycle, etc. and a change in the distance to the object can be detected. Also, detecting distance from the vehicle 1 to an object may be restricted so as to eliminate other objects unnecessary for assisting parking. For example, an object equal to or more than three meters apart from the vehicle 1 may be configured not to be detected, so that the object can be eliminated as a unnecessary image.

The image-processing portion 13 includes an image processing ASIC. The image processing ASIC distinguishes an object by using image information from the color camera 6 and distance information from the infrared laser camera 7. By way of using a high-speed microcomputer, the image processing ASIC carries out various display processes such as an image-clipping process, a distortion correction, a process for obtaining a top-view, image compression, image-recording, an image-rotating process, a white line detecting process, calculated route display, parking position display, color display classified by distance and a process for displaying an amount of deviation of a steering operation.

The sound guidance circuit 20 is employed for guiding parking-operation by sound after completion of automatic/manual-determination of a parking position (a position where the vehicle is to be parked). The sound guidance circuit 20 issues, for example, intermittent sound "p, p, p . . . " of which an interval corresponds to an amount of deviation comparing to a proper rudder angle for steering. The amount of deviation from a proper rudder angle obtained according to a calculated travel route based on a rudder angle of steering and an image obtained by the color camera 6 is notified by way of the interval of the intermittent sound, e.g., the interval may be configured to be shorter when an amount of the deviation is smaller, whereas the interval may be configured to be longer when an amount of the deviation is larger.

Figure 4A:
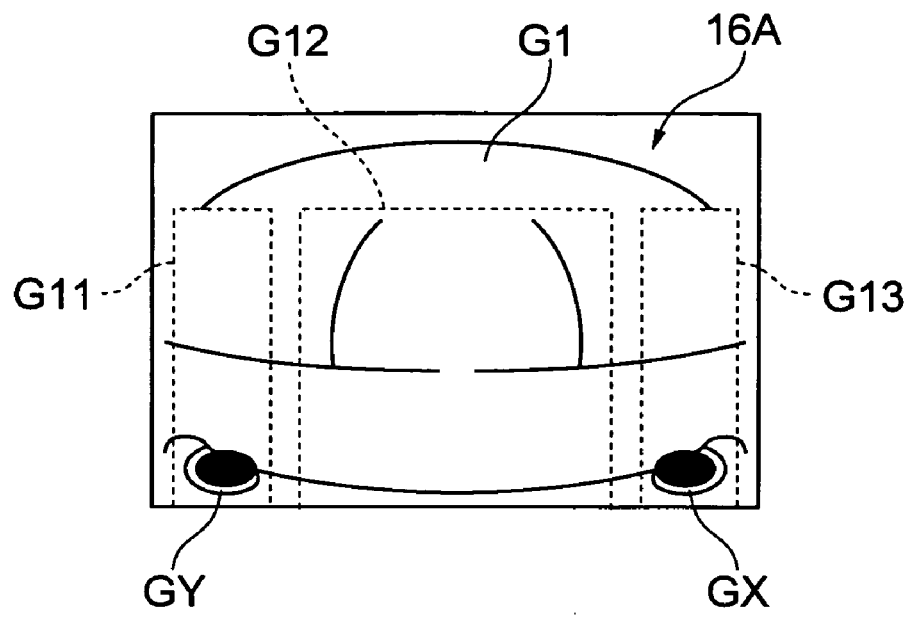
FIG. 4A is a view showing one example of an image taken by a left-side camera according to one embodiment of the present invention.

A super-wide-angle lens such as a fisheye lens is employed for the each color camera 6 of the side camera units 4, 5. A fisheye lens having a small distortion may be employed. FIG. 4A is a view showing an image G1 taken by the color camera 6 of the side camera unit 4, which is displayed on a screen 16A of the display monitor 16. In FIG. 4A, a mark "G11" designates a region of an image of a left rear of the vehicle, "G12" designates a region of an image of just a left side of the vehicle, and "G13" designates a region of an image of a left front side of the vehicle. This system may be used as a left side camera by way of clipping, enlarging and displaying the image of G13 (See FIG. 5B). In FIG. 4A, "GX" and "GY" designate images of a left front wheel and a left rear wheel, respectively. Further, if the image of G12 is clipped, enlarged and displayed, it may be used as an image of just a right side of the vehicle for distinguishing a line for determining a parking position.

Figure 4B:
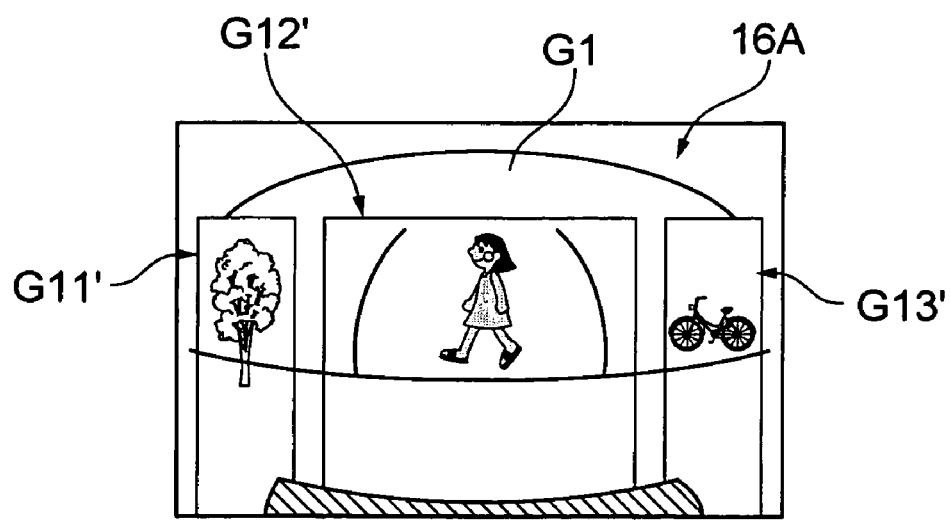
FIG. 4B is a view showing one example of an image taken by a rear camera.
Figure 5A:
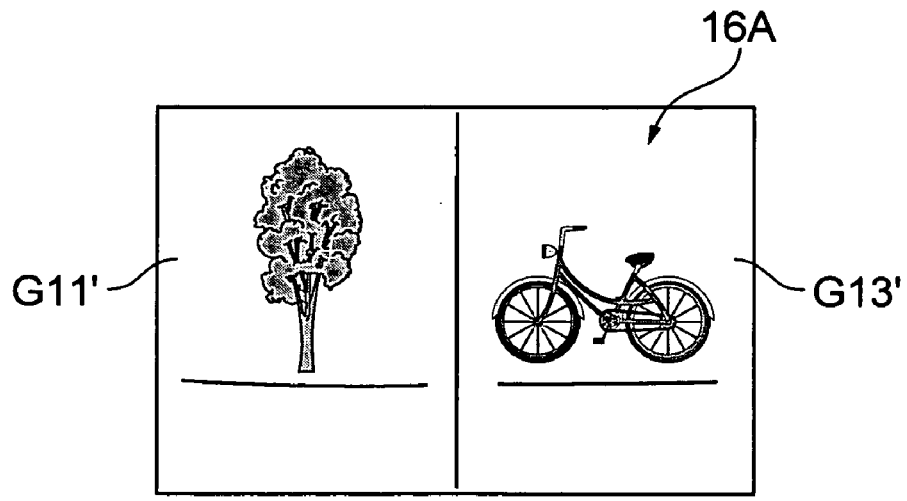
FIG. 5A is a view showing an example of combination of images obtained by a rear camera.
Figure 5B:
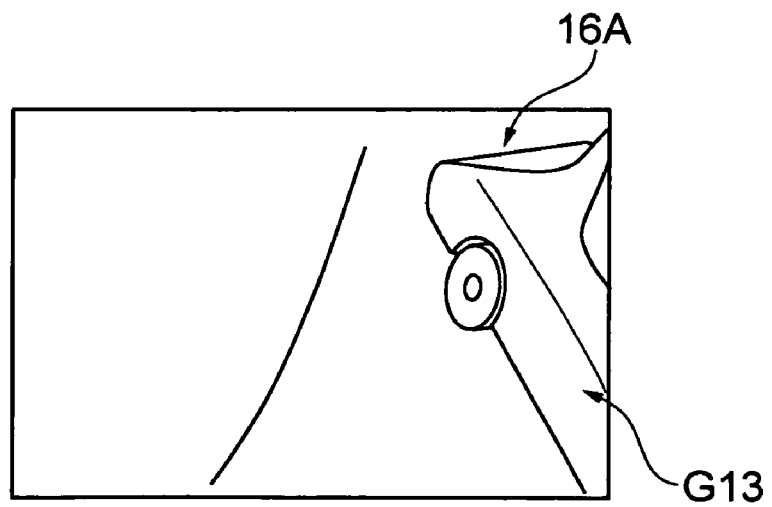
FIG. 5B is a view showing a state of a screen on which a clipped and enlarged image obtained by a rear camera is displayed.
Figure 6A:
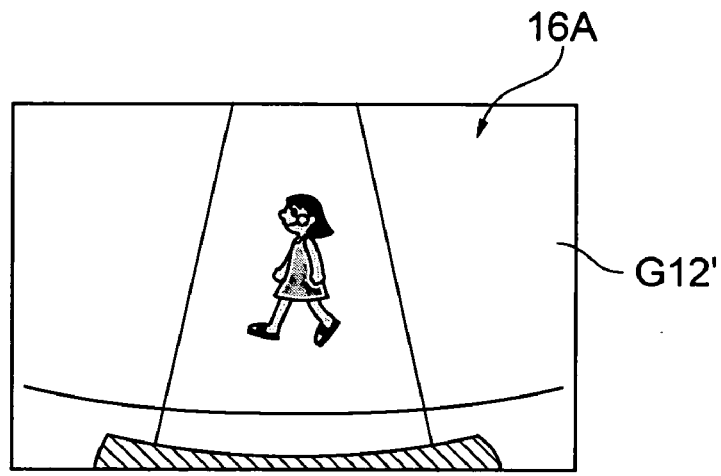
FIG. 6A is a view showing an image behind a vehicle obtained by a rear camera.
Figure 6B:
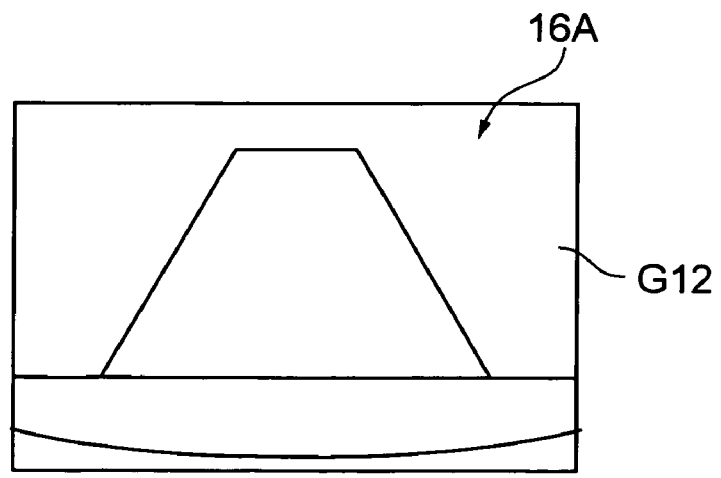
FIG. 6B is a view showing a state of a screen on which a clipped and enlarged exact-rear image obtained by a rear camera is displayed.

An image G11' of the left rear of the vehicle, an image G12' substantially just posterior to the vehicle, an image G13' of the right rear of the vehicle can be imaged by way of employing a super-wide-angle lens such as a fisheye camera for the color camera 6 of the rear camera unit 3 (See, FIGS. 4B, 5A and 6A).

The image-processing ASIC carries out clipping an image in a region enclosed with a broken line-frame shown in FIG. 4A. The image-processing ASIC performs distortion-elimination and enlargement when clipping the image. Likewise, as to the rear camera unit 3, an image region can be enlarged and displayed.

In this example, as shown in FIG. 5A, a clipped image from the image region G11' of the left rear of the vehicle and a clipped image from the image region G13' of the right rear of the vehicle are displayed in parallel on the screen 16A of the display monitor 16. When the clipped image from the image region G11' of the left rear of the vehicle and the clipped image from the image region G13' of the right rear of the vehicle are displayed in parallel on the screen 16A as shown in FIG. 5A, other cars approaching the vehicle 1 from both left and right sides thereof can be simultaneously checked. Also, blind spots posterior to the vehicle can be checked during backing the vehicle up.

Further, as shown in FIG. 6A, an image substantially just posterior to the vehicle may be enlarged and displayed on the screen 16A, so that the rear of the vehicle can be easily checked. Images taken by the rear camera unit 3 and by the left side camera unit 4 (right side camera unit 5) may be simultaneously displayed in parallel on the screen 16A (two-screen combination).

Figure 7:
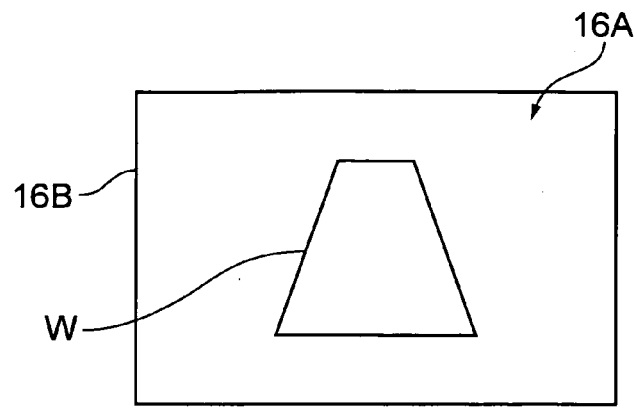
FIG. 7 is a view showing a state of a screen on which only white lines which indicate a parking space are displayed.
Figure 8:
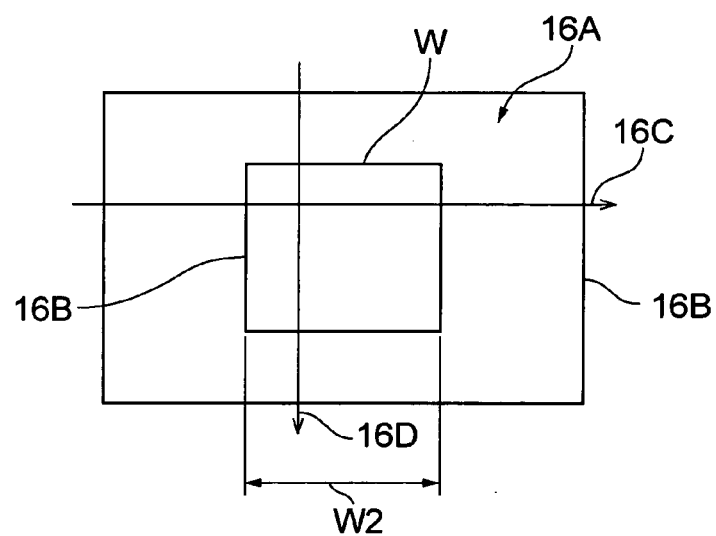
FIG. 8 is an explanatory view showing a state of a screen where an image of FIG. 7 on which a process for obtaining a top-view image is performed is displayed.
Figure 9:
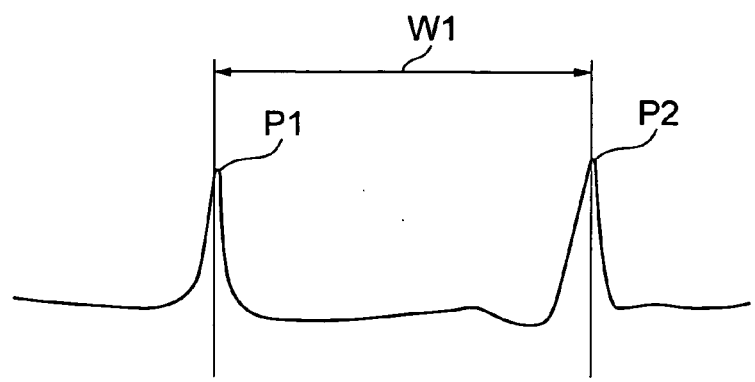
FIG. 9 is a view for explaining a white line-detecting process performed on the image shown in FIG. 7.

When a line W indicating a parking space exists in an image, the image-processing ASIC carries out the process for obtaining a top view, so that the line can be distinguished. In this embodiment, the parking-assist system can distinguish a white line as a line indicating a parking space. That is, the image-processing ASIC can distinguish white line(s) W as a line indicating a parking space. Although the image-processing ASIC can be configured to distinguish a line indicating a parking space, preferably, it may be configured to distinguish a white/yellow line which is generally used as a line for indicating a parking space. The white lines W are displayed as the image shown in FIG. 7 before the process for obtaining a top view is carried out, whereas it is displayed parallel to vertical frames 16B of the screen 16A as shown in FIG. 8. Then, the image-processing ASIC integrates brightness (calculates brightness integral) of each horizontal scanning line 16C in a longitudinal direction (vertical direction) 16D, so that peaks P1, P2 corresponding to high-brightness parts can be obtained as shown in FIG. 9.

Thus, the image-processing ASIC can distinguish the white lines W. Further, an actual distance W2 between the white lines W can be obtained by calculating a width W1 between the peaks P1 and P2. In FIG. 8, the distance W2 is shown as a distance on the screen. Normally, the distance W2 between white lines W in a parking space is set to a certain width. Thus, by comparing a normal width W2 between normal white lines W to the width W1 between the peaks P1 and P2, whether the peaks P1, P2 correspond to white lines W indicating a parking space or not can be calculated.

Figure 10:
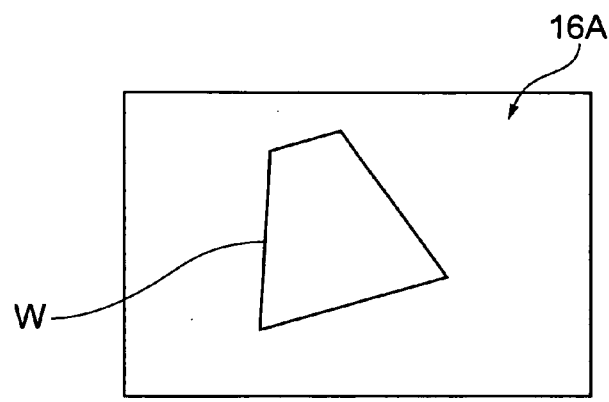
FIG. 10 is a view showing a screen on which only white lines obtained in an angle-parking are displayed.

When the vehicle is parked diagonally, on the screen 16A the white lines W are displayed diagonally to the vertical frames 16B of the screen 16A as shown in FIG. 10. In such a case, the image may be rotated so that the white lines W may extend vertically to the vertical frames 16B of the screen 16A as shown in FIG. 7, and then the process for obtaining a top view is executed onto the image, thereby the white lines W are properly distinguished.

Sensitivity of the camera 6 is decreased during the night, etc., thus, to distinguish a white line with camera 6 is normally difficult. However, in this embodiment, reflection of infrared laser light can be utilized, thus performance of distinguishing a white line is improved.

The infrared laser camera 7 can obtain distance information in real time on a pixel to pixel basis by way of comparing reflex time/phase of the diffusive laser light irradiated from the small laser emitting devices 8. The image-processing ASIC can distinguish an object three-dimensionally based on the distance information from the infrared laser camera 7.

According to this system, since an impediment can be distinguished with the infrared laser camera 7, movement of the impediment/object can be detected. Thus, safety may be enhanced.

Figure 11:
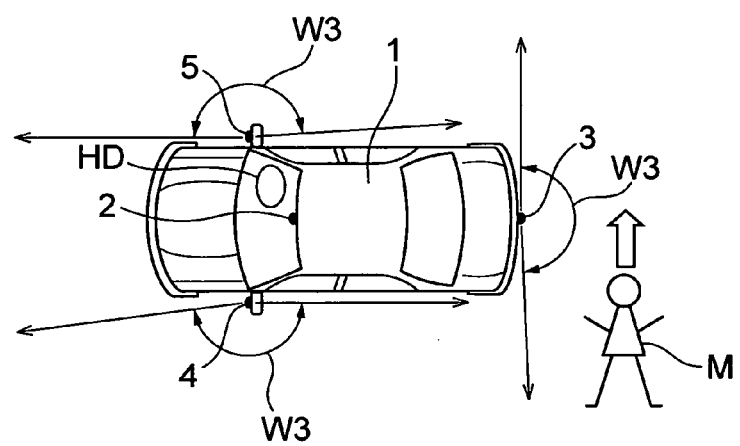
FIG. 11 is an explanatory view showing a situation where an object approaches a vehicle.
Figure 12:
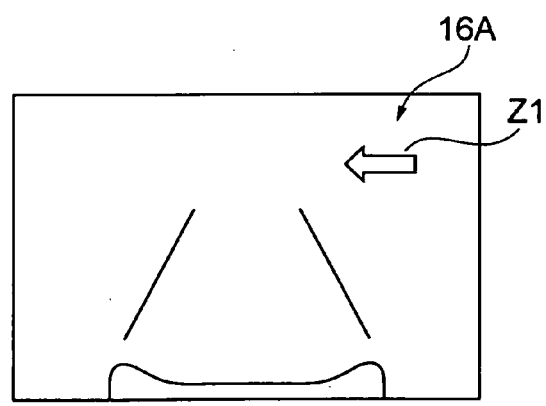
FIG. 12 is a view showing a screen on which the object shown in FIG. 11 is displayed together with an image taken by a rear camera unit.

Since the infrared laser camera 7 employs a super-wide-angle lens, close objects can be detected with high accuracy. Thus, movement of an impediment/object can be detected with the image-processing ASIC. In the case a person M moves across to a backward direction of movement of the vehicle 1 as shown in FIG. 11, an arrow mark Z1 which corresponds to the movement of the person M, indicating the approach of an object to the vehicle 1, can be displayed as shown in FIG. 12, so that safe parking operation may be effectively ensured. Alternatively, the approach of an object may be notified with alarm sound. In FIG. 11, each mark "W3" designates an imaging range of each camera unit 3-5, and the imaging range W3 may be, for example, 180 degrees.

Figure 13:
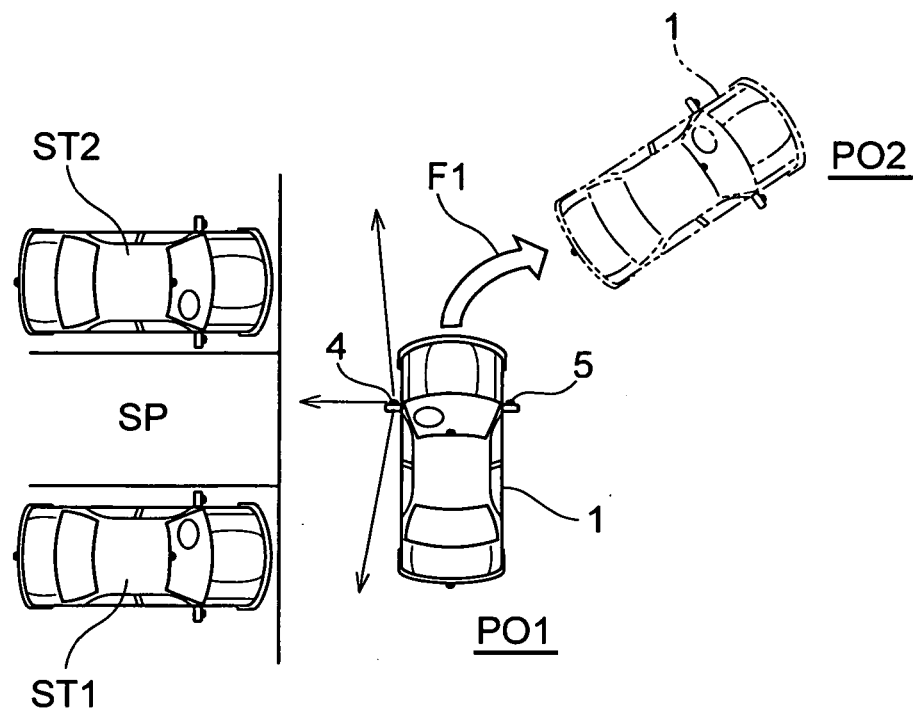
FIG. 13 is a view showing an example of a parking-assist system according to the present invention, used when a vehicle is double-parked.
Figure 14:
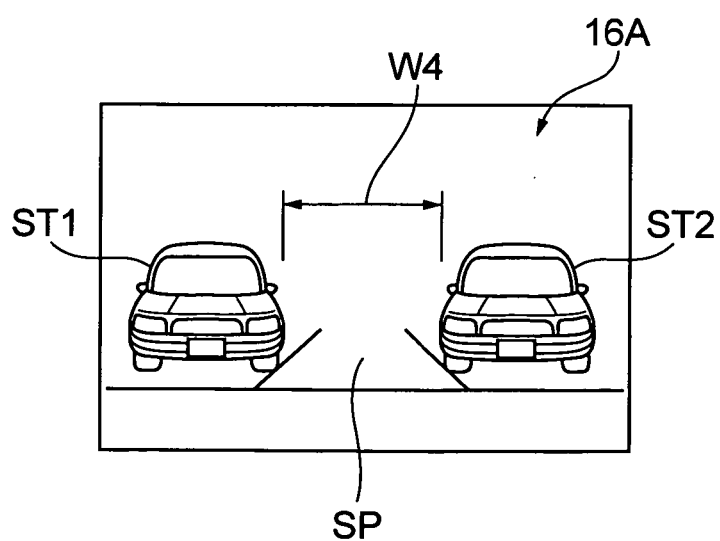
FIG. 14 is a view showing a state of a screen on which an image taken by a left side camera unit is displayed in double-parking.

As shown in FIG. 13, for example, when a parking space SP exists between two parked vehicles ST1, ST2 and the vehicle 1 is positioned in a location PO1 just lateral to the parking space SP, an image taken by the left side camera unit 4 is displayed on the screen 16A as shown in FIG. 14 and a spacing W4 can be calculated by the image-processing ASIC according to the distance information obtained by the infrared laser camera 7. Thus, whether the spacing W4 capable of holding the vehicle exists or not can be decided by referring to the image.

Figure 15:
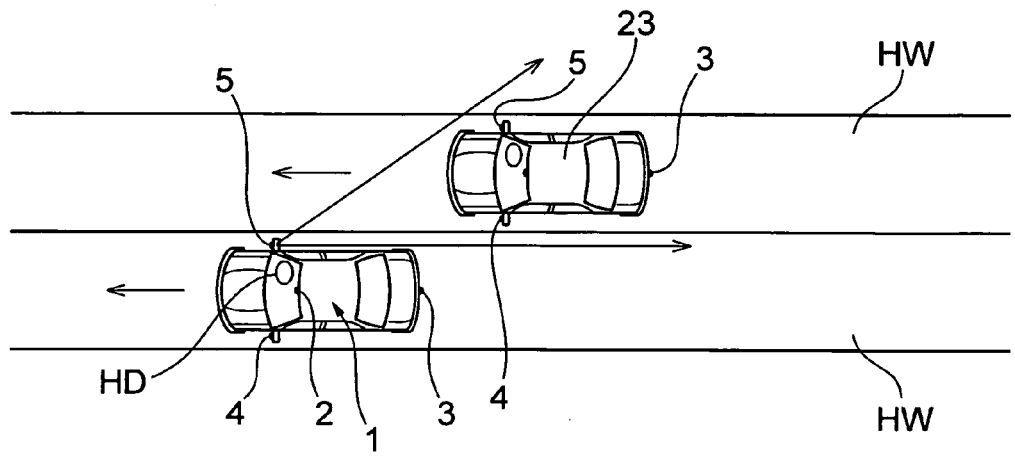
FIG. 15 is an explanatory view showing an example of a method of detecting an approaching car when the vehicle concerned runs over an expressway.

Also, as shown in FIG. 15, for example, in the case where a lane change is made when the vehicle 1 drives on an express highway HW, the right side camera unit 5 may be configured to be initiated when a direction indicator is turned on. By so doing, an image taken by the right side camera unit 5 is displayed on the screen 16, and further, if another vehicle 23 approaching to the vehicle 1 exists the distance to the vehicle 23 is displayed. Thus, whether change lanes may be safely made or not can be checked.

Figure 16:
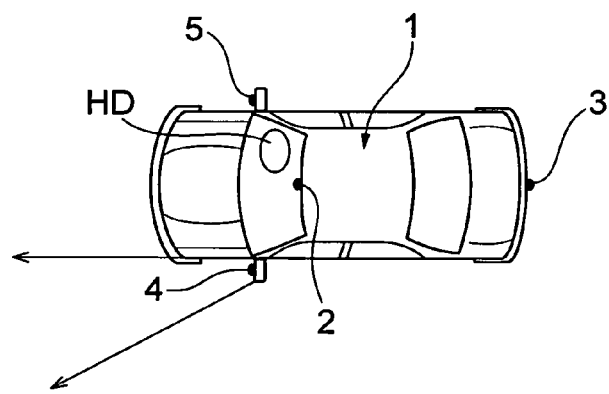
FIG. 16 is an explanatory view showing an example of a method of detecting a central point of the steering wheel.
Figure 17:
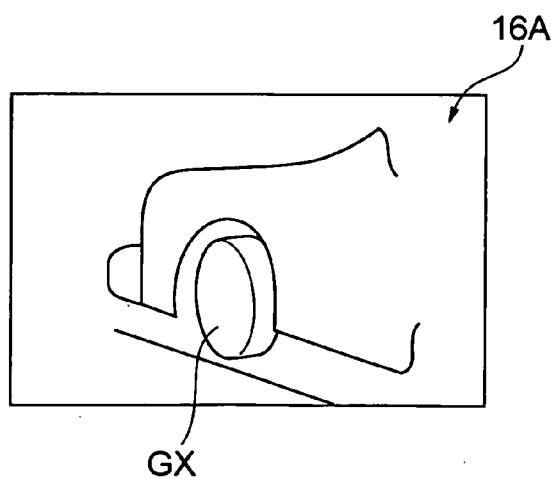
FIG. 17 is a view showing a screen on which an image of a left-front-lower portion of the vehicle concerned taken by a left side camera unit is displayed.

When the vehicle 1 is backed up, e.g., a tilt of the left front wheel (tire) GX is used for determining a center position of a steering wheel HD. For example, the left side camera unit 4 is configured to be simultaneously initiated when a gear-shift of the vehicle 1 is put into reverse. Then, as shown in FIG. 16, an image of the left front side of the vehicle 1 is taken by the infrared laser camera 7 of the left side camera unit 4, and, as shown in FIG. 17, an image of a left front lower part of the vehicle 1 is clipped and displayed on the screen 16A. By so doing, a tilting amount of the left front wheel GX can be calculated with the clipped image and the information of each pixel as to a distance to the left front wheel GX.

The steering wheel HD reaches an end of its rotation when two turns are made. When the steering wheel HD is turned one time, the rudder angle thereof becomes the same as that of the steering wheel HD in the center position. Thus, generally, it is difficult to distinguish those two states with a rudder angle sensor. However, according to this system, difference between one rotated position and the center position can be distinguished with the tilting amount of the wheel on the screen. Therefore, the center position of the steering wheel HD can be determined by using the rudder angle and the image information.

According to this parking-assist system, a parking position is automatically determined with image information and distance information obtained by the side camera units 4, 5.

Distance relationships between images from the cameras are calculated in advance with relationships between positions to which the rear camera unit 3 and the side camera units 4, 5 are attached. A conventional side camera is used for checking only a left front side of a vehicle, and a horizontal field angle thereof is about 90 degrees, i.e., the field angle is small. On the contrary, the side camera units 4, 5 according to this embodiment of the present invention can obtain a broad range of an image with a fisheye lens.

Functions of a parking-assist system according to a first embodiment of the present invention will be described below.

[Parking-Assist for Reverse Parking]

In the case where the vehicle 1 is to be double-parked, when the left switch of the parking-assist system is on and a speed of the vehicle 1 is equal to or less than 10 km/h, the camera units 3–5 are initiated and the system begins to record a surrounding image and distance information.

In the instance that the vehicle 1 is to be parked in the parking space SP shown in FIG. 13 as a target parking position, the vehicle 1 runs along arrow mark F1 passing a mark "PO1", and then once stops a ready-to-park position designated by a mark "PO2". During this running of the vehicle 1, (surrounding) images are taken by the left side camera unit 4. The surrounding images and distance information obtained by the left side camera unit 4 are sequentially recorded on the memory/recording medium 15. The distance information as to one pixel of the infrared laser camera may, for example, be related to the image information either as to one pixel or a predetermined section of the imaging camera. When a driver gets into reverse gear, a series of the images and the distance information are reverse-sequentially read from the memory/recording medium 15. Then, at the ready-to-park position PO2, the series of the surrounding images obtained after the parking-assist is initiated are reverse-sequentially reproduced (played back in reverse), commencing with the image corresponding to the position PO2, and a target parking position is searched for.

Normally, the search is conducted through the information corresponding to about five meters running range. The parking-assist system makes search for a parking position by the white line distinguishing process and the distance information, and then determines whether the parking space SP has a proper capacity for the vehicle 1 or not. Thereby, a target parking position is displayed on a screen 16A. At this time, the parking space SP is configured to be displayed and positioned on substantially center of the screen.

When the vehicle 1 is directed diagonally to the white line W, the image is rotated and the process for obtaining a top view is executed thereon, and then the white line detecting process is performed. Next, the image is rotated by 90 degrees and a depth of the parking space SP is calculated. If no white line W exists or the white line W cannot be distinguished, an indication marker may be displayed by a manual operation of the parking-position setting switch, thereby a target parking position can be set.

Further, a distance to an impediment around the vehicle 1 and the parking space SP are calculated with the distance information obtained by the infrared laser camera, and a warning is given to the driver as need arises.

Figure 18:
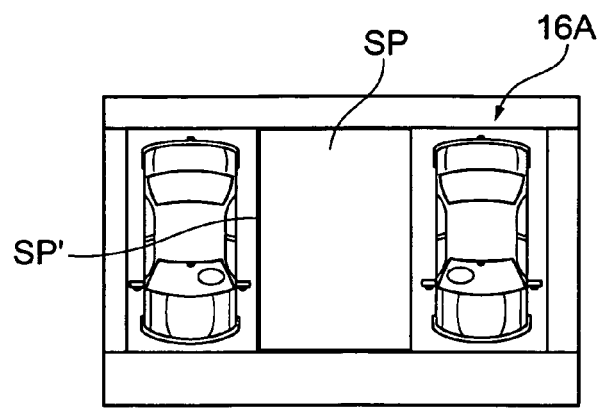
FIG. 18 is an explanatory view showing an example of a state of a screen where an image of white lines on which a process for obtaining a top-view is performed is displayed, at the time a parking position is determined.
Figure 19:
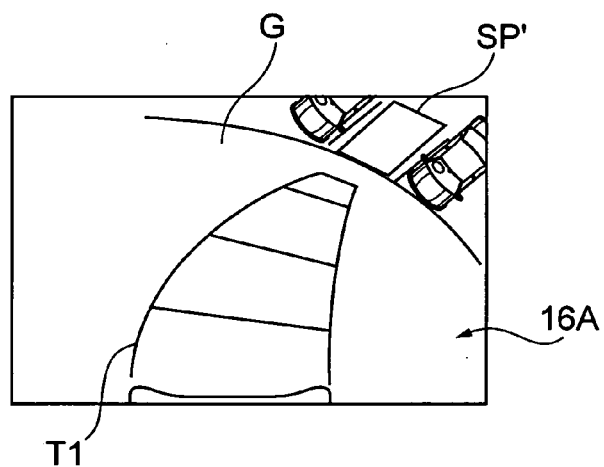
FIG. 19 is a view showing a state of a screen on which white lines at the time a parking position is determined superimposed on a rear image at the time a parking position is determined are displayed.

A potential target parking position is displayed onto images obtained by the rear camera unit 3 and the left side camera unit 4, and the setting for a target parking position is finalized when the driver confirms the potential target parking position displayed in the image (by turning on a confirmation switch). FIG. 18 shows a state where the target parking position is displayed on the image obtained by the left side camera unit 4. FIG. 19 shows a state where the target parking position is displayed on the image obtained by the rear camera unit 3 when the vehicle 1 stops the ready-to-park position PO2 shown in FIG. 13. In FIG. 18, "SP'" designates a confirmed mark.

In reverse parking, a calculated path for parking (calculated parking route) described below is superimposed on an image G obtained by the rear camera unit 3. The image G is taken at the ready-to-park position PO2.

Figure 20:
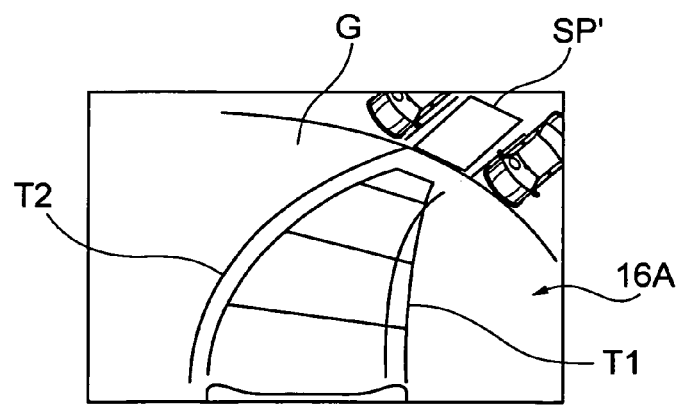
FIG. 20 is an explanatory view showing a state where an calculated passing route on condition that a steering operation is fixed and the most appropriate guide route for parking are superimposed and are displayed on a screen.

In this case, as shown in FIG. 20, a proper parking guide route T2 to be performed by the most appropriate steering operation is calculated and displayed according to a relationship between information as to distance from the ready-to-park position PO2 representing a present parking position to the target parking position, a turning radius based on a wheel base, and so forth. In FIGS. 19 and 20, a mark "T1" designates a calculated parking route when a steering operation remains unchanged. The calculated parking route T1 is calculated based on operation information as to the steering wheel HD.

When an amount of a deviation between the most appropriate steering operation and a present steering operation is great, the amount of the deviation is quantitatively notified to the driver by generating a sound (warning sound) and/or by displaying a warning sign on the screen. A bar graph, etc. may be used for displaying the amount of the deviation on the screen. In this case, the proper parking guide route means a parking guide route performed by a minimum steering operation.

When the vehicle 1 enters the parking space, a stopping position is determined according to a driver's decision or distance information obtained by the infrared laser camera. In the case where an impediment such as a person, another vehicle, a bicycle or the like approaches the vehicle 1 while the vehicle 1 is being parked, a warning sound for noting danger is provided and a marker indicating the approaching impediment is displayed on the screen. A warning level, i.e., a range of an impediment's distance from the vehicle 1 which initiates the warning operation can be selected and be set by the driver.

In this parking-assist system, in the case where approach of an impediment is configured to be notified with a warning sound, parking operation can be carried out without watching the screen and the driver can concentrate in a steering operation for parking.

When an impediment such as a wall exists in the parking area, information concerning a distance to the wall can be displayed by way of colors or numeric values. Further, since this parking-assist system can detect an object three-dimensionally, a height, size, etc. of the object can be obtained and displayed on the screen. Thus, comparing to a conventional system detecting a movement of an object according to a change in brightness, the occurrence rate of detecting error caused by influence of a wind/shadow can be reduced. Therefore, detecting accuracy may be improved.

In the case where a steering operation is configured to be performed in conjunction with the vehicle control, automatic parking can be carried out.

[Parking-Assist for Parallel Parking]

Figure 21:
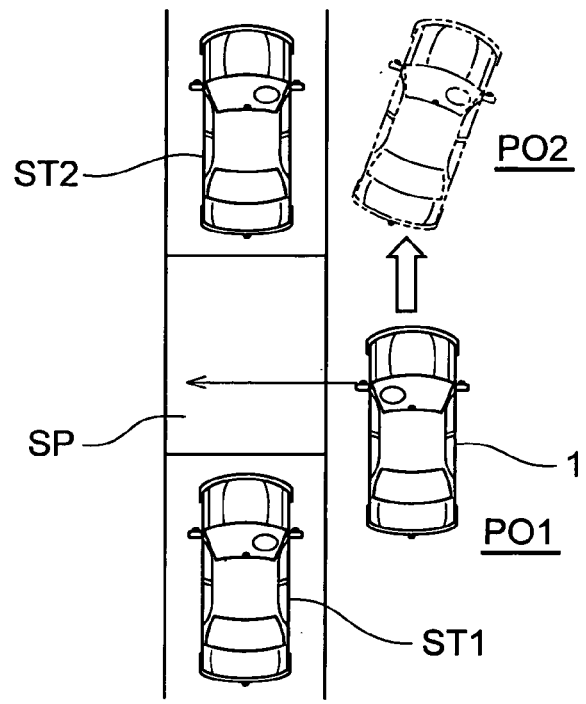
FIG. 21 is a view for explaining an example of a parking-assist system according to the present invention, used in a parallel parking.

When the vehicle 1 is to be parallel parked, as shown in FIG. 21, the vehicle 1 passes the side of a parking space SP and is temporarily stopped at a ready-to-park position PO2, for example.

Figure 22:
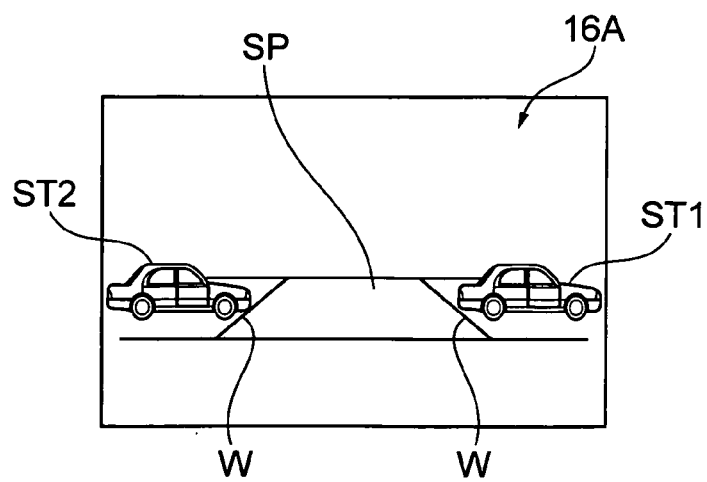
FIG. 22 is an explanatory view showing a state of a screen on which an image taken by a left side camera unit shown in FIG. 21 is displayed.

When the gearshift of the vehicle 1 is put into reverse, stored images and distance information are played back in reverse, and an image of the parking space SP is searched for. Then, as shown in FIG. 22, the image of the parking space SP is displayed on the screen 16A. The process for obtaining a top view is performed on the image shown in FIG. 22, then an image as shown in FIG. 22 is obtained, and a white line is detected by performing the white-line detecting process on the obtained image.

Figure 23:
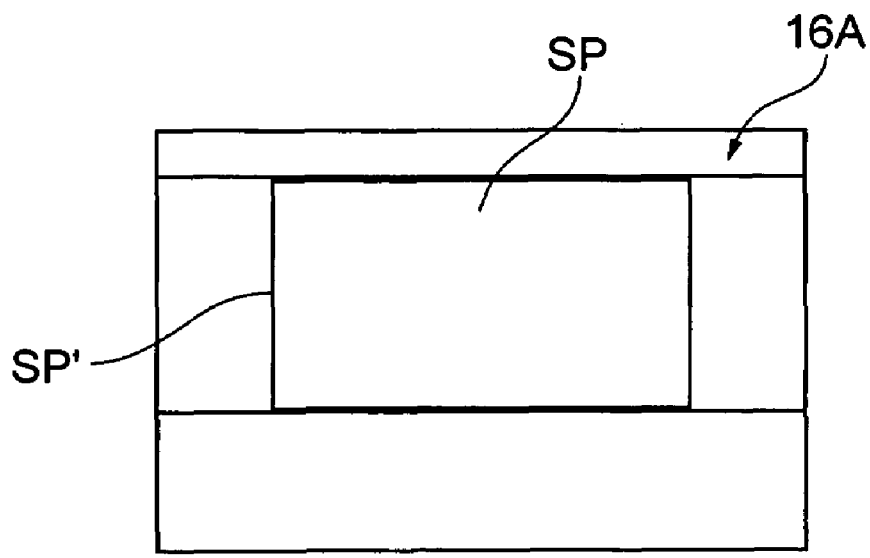
FIG. 23 is an explanatory view showing a state of a screen where white lines shown in FIG. 21 on which a process for obtaining a top-view is performed are displayed.
Figure 24:
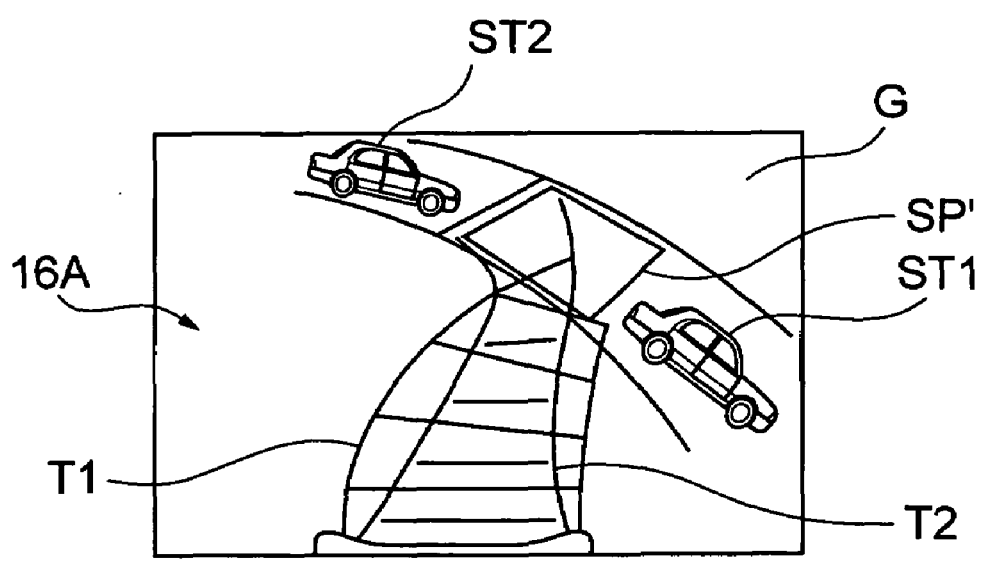
FIG. 24 is an explanatory view showing a state where an calculated passing route on condition that a steering operation is fixed and the most appropriate guide route for parking are superimposed and are displayed on a screen.

Next, as shown in FIG. 24, an image being obtained by the rear camera unit 3 and the image shown in FIG. 23 are checked, a (target) parking position is set, and a parking-assist operation for parallel parking is initiated when the parking-position setting switch is turned on.

Comparing to a double parking operation, a steering direction should be reversed in a parallel parking operation. A turning point, i.e., a point where the steering wheel may be turned over in a reverse direction, is calculated according to a relationship between the ready-to-park position PO2 and the target parking position.

The turning point is notified to the driver by a sound and a screen display. The relationship between the vehicle 1 and other vehicles ST1, ST2 parked in font of and at the back of the parking space SP is calculated by obtaining distance information by the left side camera unit 4 and the rear camera unit 3. Then, the system gives guidance so that the vehicle 1 does not hit against the vehicle ST1/ST2 parked in front of or at the back of the parking space SP.

In this situation, since a left front portion of the vehicle 1 approaches the vehicle ST1 positioned anterior to the vehicle 1, attention to the spacing between the vehicle 1 and the vehicle ST1 should be paid during the parking operation. Further, the spacing between the vehicle 1 and the vehicle ST1 positioned anterior to the vehicle 1 cannot be calculated only by checking the image of the vehicle ST1 displayed on the screen. However, since the parking-assist system according to this embodiment obtains distance information and detects an object three-dimensionally, the spacing between the vehicle 1 and the vehicle ST1 positioned anterior to the vehicle 1 can be calculated. Thus, as the spacing becomes closer, the situation thereof can be notified by, for example, changing an intermittent sound "p, p, p . . . " into a continuous sound, displaying the spacing on the screen, or changing a color of the screen so that the change of the spacing can be visually checked.

On or after the completion of parking, the operation of the parking-assist system is stopped by operating a termination button.

During a normal cruise (running), this parking-assist system can function as a drive-recorder for analyzing a traffic accident by using its record/playback function.

The front camera unit 2 and the rear camera unit 3 are preferably used in a normal cruise of the vehicle 1, however, those cameras can be switched to the side camera units 4 and 5 according to a driving situation of the vehicle 1. Further, if the system includes a large capacity memory for recording images, all camera units 2–5 can be used for recording images when the vehicle 1 runs normally.

Images taken by the camera units are image-compressed at the image-processing portion 13. MPEG1, MPEG2, MPEG4, etc. are known as image-compression techniques. Preferably, an electronic watermark technique and/or an encryption technique may be used for preventing recorded images from falsification, etc. In this embodiment, a mapping technique for a top-view image is used in order to encrypt recorded images.

A top view image is used for mapping an image signal with ROM data, and an image is encrypted by using ROM data. This encryption may be performed by randomly switching pixels by using a conversion function for obtaining a top-view image. If only the memory/recording medium 15 is detached and reproduced with another reproduction device, the image cannot be reproduced correctly because of the encryption thereof. Thus, falsification of the image can be prevented. An inverse operation using ROM data is performed in order to reproduce the original image.

The parking-assist system may record outside sound simultaneously with images. For example, a break noise, collision noise, railroad crossing bell, ambulance siren, etc. can be recorded, and thereby proper instructions/warning can be provided for the driver by distinguishing and utilizing the sound(s).

When driving data of the vehicle are recorded, the vehicle speed signals S4, GPS data S6, CAN-BUS data S3 may be used. Also, if a break signal and the like are configured to be recorded, adequacy of a driving operation, etc. can be judged. This driving data are also encrypted so as to prevent falsification.

A skip-back method and an overwrite method are used for recording images and sounds.

In the skip-back recording method, data corresponding to predetermined amount of time are recorded at any time. In the case where a traffic accident occurs, for example, the acceleration sensor signal S5 from an acceleration sensor is detected (as a trigger) and data between 20 seconds prior to the trigger and 15 seconds after the trigger are stored. Although the storing period can be set at will, important data (i.e., data some seconds before and after the trigger, in this case) are configured not to be deleted.

Since a driving state of the vehicle can be monitored by the acceleration sensor, a warning may be issued when unsafe/drowsy driving occurs. Further, since a location data from a GPS is used, a unsafe location can be notified in advance. Also, recording vehicle's running states may be initiated by hand when the vehicle 1 runs normally. A running state by which an accident is predicted according to a distinguished image and/or distance information obtained by the infrared laser camera(s) may be used as a trigger for recording.

Figure 25:
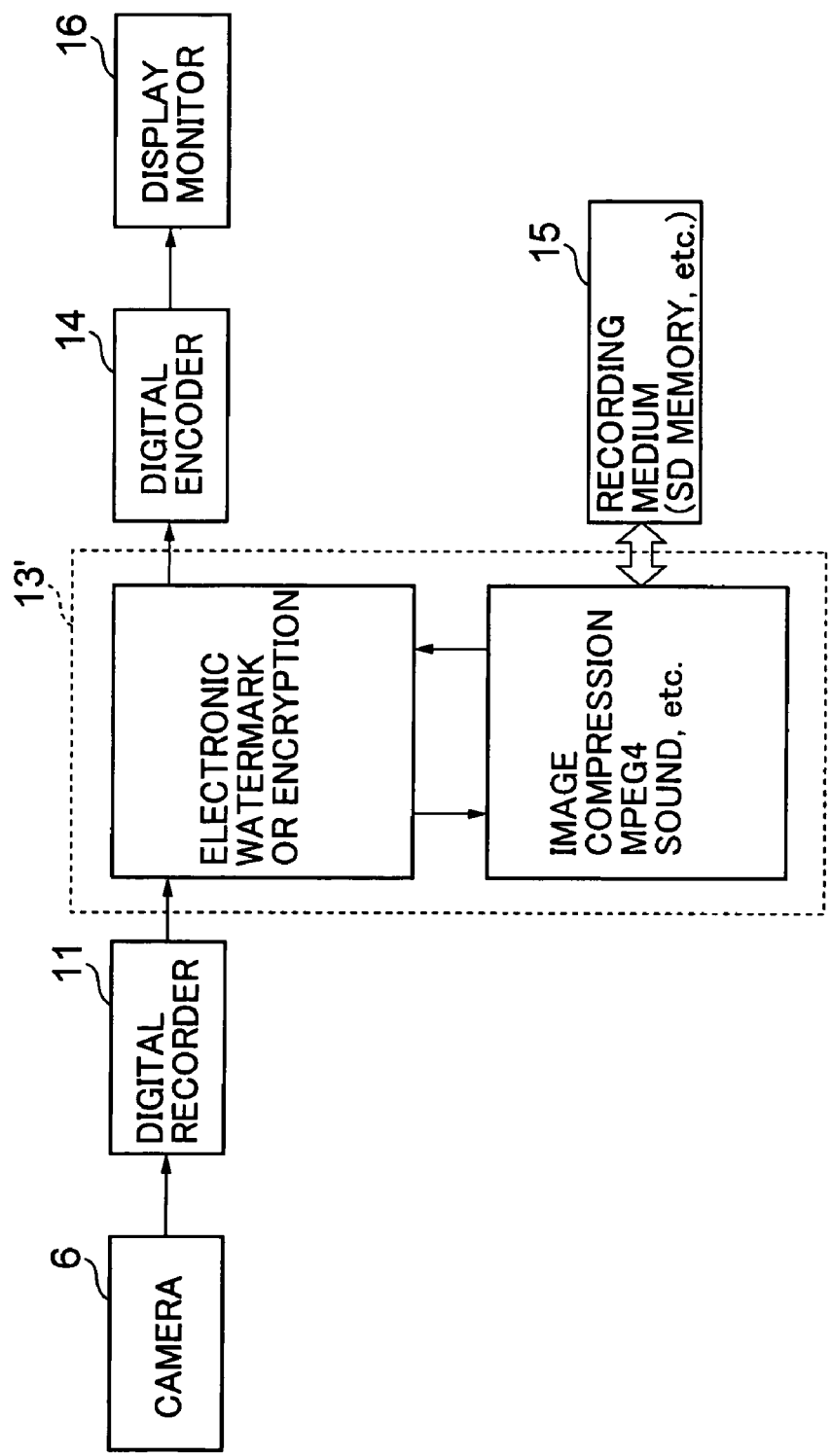
FIG. 25 is a schematic view showing a parking-assist system according to the present invention, used as a drive-recorder.

FIG. 25 is a schematic diagram showing a structure for enabling the parking-assist system to function as a drive recorder. In FIG. 25, same symbols are respectively used in order to designate components having the same functions of components in FIG. 3, so that repetitive explanations may be avoided.

An image-processing portion 13' includes a program for performing an electronic-watermark/encryption process. After the image-processing portion 13' performs an electronic-watermark/encryption process with the processing program, the portion 13' carries out image-compression and a sound-adding process and then records processed data on the memory/recording medium 15.

A hard disc, a SD memory card, a flash memory, etc. may be employed as the memory/recording medium 15. By transmitting recorded data and electrical power with contactless method, a complete waterproof/fireproof structure can be made. Thus, the recorded data may be protected in the case where a vehicle fire, vehicle flooding, etc. occur.

The memory/recording medium 15 can be water-resistant, if, for example, electric power and data may be transmitted with electromagnetic induction, and a fire-resistant case and a water-resistant structure are used for the medium 15.

A battery as an emergency power supply, e.g. an electrical capacitor, may be employed in the memory/recording medium 15 so that the recorded image corresponding to a predetermined period just before and after a (traffic) accident can be transmitted to an external memory even when the electric power is cut off because of the accident. Security can be ensured by improving control over the system. Since the recorded data cannot be read easily only with the memory/recording medium 15, privacy can be protected. In addition, the memory/recording medium 15 may be directly connected to other device with a cable.

Figure 26:
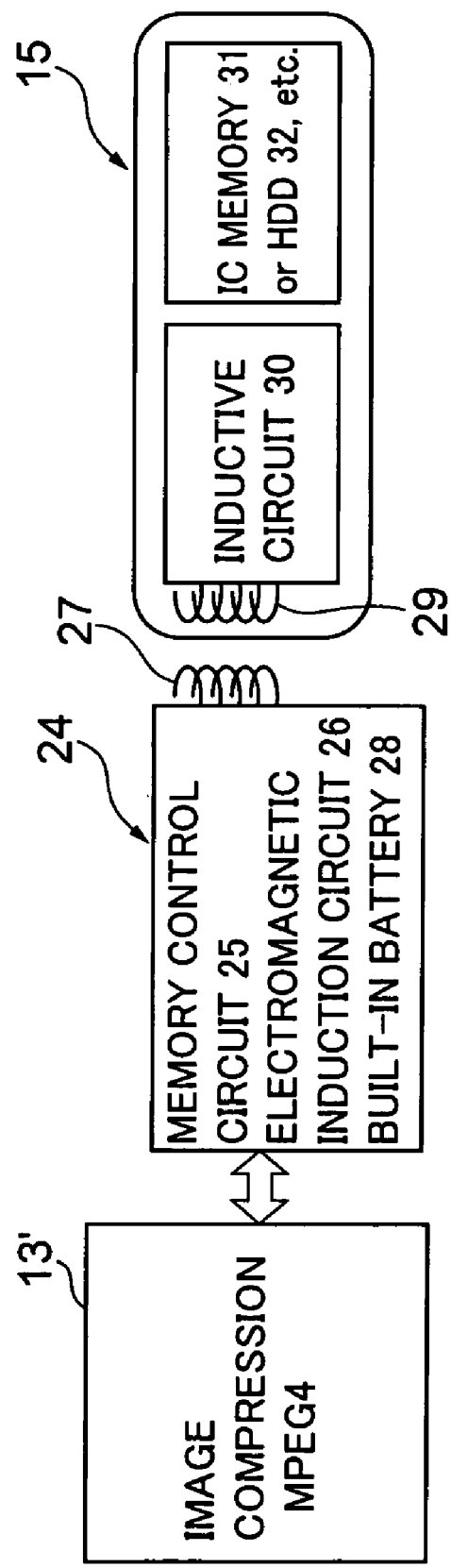
FIG. 26 is a block diagram for explaining a relationship between a recording medium shown in FIG. 25 and a contactless-type (noncontact type) read/write drive.

FIG. 26 is a schematic diagram showing a storage medium having a complete water/fire resistant structure. In FIG. 26, a symbol 24 designates a contactless read/write device. The contactless read/write device 24 is provided with a memory control circuit 25, an electromagnetic induction circuit 26, an inductive coil 27 and a built-in battery 28. The memory/recording medium 15 is provided with an inductive coil 29, an inductive circuit 30, IC memory 31 and a hard disc 32. A housing of the memory/recording medium 15 has a complete water resistant structure. The housing is filled with a heat insulator such as asbestos.

In a regular operation, the recorded images can be reproduced without any additional apparatus. In the case the system beaks down because of a traffic accident and the like, the memory/recording medium 15 may be detached therefrom. The image information stored in the memory/recording medium 15 may be read by the contactless read/write device and reproduced by a personal computer.

If a contactless system is not adopted in the memory/recording medium 15, the image information can be reproduced by connecting the memory/recording medium 15 to a personal computer like a conventional way. In this case, encryption of the encrypted image can be decoded with a decoding key. Further, electronic watermark may be detected with an exclusive software program, thereby whether falsification is made or not can be checked.

As described above, one feature of the present invention is that the parking-assist system for providing parking-assist information includes: a first imaging camera configured to image a front side of a vehicle; a second imaging camera configured to image a left side of the vehicle; a third imaging camera configured to image a right side of the vehicle; a fourth imaging camera configured to image a rear side of the vehicle; a first infrared laser camera configured to obtain information on a distance as to the left side of the vehicle on a pixel to pixel basis; a second infrared laser camera configured to obtain information on a distance as to the right side of the vehicle on a pixel to pixel basis; a third infrared laser camera configured to obtain information on a distance as to the rear side of the vehicle on a pixel to pixel basis; and a signal processing portion to which information on images from one or more of the imaging cameras and the information on the distances from one or more of the infrared laser cameras are inputted; wherein the parking-assist system provides the parking-assist information according to the information on the images from the one or more of the imaging cameras and the information on the distances as to each pixel from the one or more of the infrared laser cameras. According to this feature, the parking-assist system can reduce a driver's burden of steering operation for parking.

According to another feature of the present invention, the parking-assist system further includes a recording medium, wherein the parking-assist system records the information on the images from one or more of the imaging cameras and the information on the distances as to each pixel from one or more of the infrared laser cameras on the recording medium when a speed of the vehicle is equal to or less than a predetermined value, initiates a parking-assist operation at the time when a gearshift of the vehicle is put into reverse after the vehicle once stops, and automatically detects a parking position by reversely reproducing the recorded image information and the recorded distance information. According to this feature, the parking-assist operation is automatically initiated by the parking-assist system and the parking position can be automatically set. Thus, a beginner driver can easily carry out a parking operation with the parking-assist system.

According to another feature of the present invention, the parking-assist system performs the automatic detection of the parking position by detecting lines indicating a parking space included in the reproduced image and by distinguishing a spacing between the lines and/or a spacing of the parking space according to the distance information and/or existence/nonexistence of an impediment according to the distance information. According to this feature, the parking-assist system distinguishes the spacing of the parking space, the existence/nonexistence of the impediment, etc. in the automatic detection for the parking position. Thus, a safer parking-assist can be performed.

According to another feature of the present invention, the parking-assist system performs the detection of the lines by converting the reproduced image into a top-view image, by rotating the top-view image so that the lines may extend vertically on a screen for displaying an image, and by integrating brightness in a direction corresponding to a vertical direction of the screen. According to this feature, the parking-assist system automatically determines the parking position by distinguishing white lines by way of performing the image-rotating process and the process for obtaining a top-view. Thus, the parking position can be easily detected even in an angle-parking.

According to another feature of the present invention, the parking-assist system provides parking-assist information for guiding the vehicle to the automatically-detected parking position, the parking-assist system calculates a proper vehicular running guide route from a present position at which the vehicle stops to the parking position and the screen displays thereon the vehicular running guide route together with an image of the rear. According to this feature, the parking-assist system is configured to display on the screen the proper vehicular running guide route superimposed over the image of the rear. Thus, even a well-experienced can make use of the information for a steering operation.

According to another feature of the present invention, the parking-assist system calculates a calculated vehicular running route based on a present rudder angle of a steering wheel of the vehicle, superimposes the calculated vehicular running route on the vehicular running guide route, displays the superimposed routes on the screen, and generates a warning sound and/or displays a warning sign when an amount of a deviation between the vehicular running guide route and the calculated vehicular running route is equal to or more than a predetermined value. According to this feature, the parking-assist system displays the proper vehicular running guide route superimposed over the image of the rear on the screen and concurrently warns the deviation between the vehicular running guide route and the calculated vehicular running route. Thus, the parking operation can be easier for a driver with the parking-assist system.

According to another feature of the present invention, the parking-assist system calculates a tilting angle of a front wheel of the vehicle according to three-dimensional distance information of the front wheel measured by one of the infrared laser cameras located on the both sides of the vehicle, and determines a central point of the steering wheel by relating the tilting angle of the front wheel to the rudder angle of the steering wheel. To determine the central point of the steering wheel may be difficult only with the rudder angle of the steering wheel. However, according to this feature, since the parking-assist system is configured to determine the central point of the steering wheel by detecting the tilting level of the front wheel, the operation for obtaining the calculated vehicular running route is correctly executed. Some cheap rudder angle sensors cannot store information on a rudder angle after a power supply of a vehicle concerned is shut off, therefore, the central point of the steering wheel may not be determined until when the vehicle drives some distance. However, according to this feature, the parking-assist system can immediately detect the central point of the steering wheel for a vehicle having such a rudder angle sensor.

According to another feature of the present invention, when the vehicle runs forward, the parking-assist system detects a state of another vehicle approaching the vehicle according to images taken by the imaging cameras located on the both sides of the vehicle and distance information obtained by the infrared laser cameras located on the both sides of the vehicle. According to this feature, the parking-assist system can detect a state of another vehicle approaching the vehicle having the parking-assist system. Thus, improvement in safety of driving can be expected.

According to another feature of the present invention, the parking-assist system further comprises a recording medium for recording an image taken by at least one of the imaging cameras when the vehicle runs forward, and the recording medium is configured to be used as a drive-recorder for recording a running state of the vehicle. According to this feature, since the parking-assist system functions as a drive-recorder, the parking assist system serves for an analysis of a traffic accident.

According to another feature of the present invention, when the recording medium is used as the drive-recorder, the image taken when the vehicle runs forward is image-compressed, is encryption-processed/electronic watermark-processed and is recorded on the recording medium. According to this feature, the parking-assist system configured to record the image taken when the vehicle runs forward after the encryption-process/electronic watermark-process is executed on the image. Thus, falsification may be avoided and privacy of the driver can be protected.

According to another feature of the parking-assist system of the present invention, the encryption process when the recording medium is used as a drive-recorder is performed by randomly transposing data corresponding to pixels with using a conversion function for obtaining a top-view image.

According to this feature, since the parking-assist system is configured to perform the encryption process with using the conversion function for obtaining a top-view image, the conversion function for obtaining a top-view image may be effectively used.

According to another feature of the present invention, the parking-assist system further comprises an acceleration sensor, and when acceleration is detected to be equal to or more than a predetermined threshold by the acceleration sensor, images corresponding to a predetermined period around the time when the acceleration is detected are recorded on the recording medium. According to this feature, since the parking-assist system is configured to record images corresponding to a predetermined period around the time when the acceleration exceeds the predetermined threshold, images obtained right before and after a traffic accident/near-traffic accident.

According to another feature of the present invention, The parking-assist system according to claim 9, wherein when a situation is judged to be unsafe according to an image from at least one of the imaging cameras and/or distance information from at least one of the infrared laser cameras, images corresponding to a predetermined period around the time when the situation is judged to be unsafe are recorded on the recording medium. According to this feature, images obtained right before and after a situation to be unsafe occurs can be recorded with the parking-assist system.

According to another feature of the parking-assist system of the present invention, the recording medium is water-resistant and capable of recording without contact. According to this feature, the running state of the vehicle stored in the parking-assist system can be protected from vehicle fire/submergence.

What is claimed is:

1. A parking-assist system for providing parking-assist information, comprising:
    a first imaging camera configured to image a front side of a vehicle;
    a second imaging camera configured to image a left side of the vehicle;
    a third imaging camera configured to image a right side of the vehicle;
    a fourth imaging camera configured to image a rear side of the vehicle;
    a first infrared laser camera configured to obtain information on a distance as to the left side of the vehicle on a pixel to pixel basis;
    a second infrared laser camera configured to obtain information on a distance as to the right side of the vehicle on a pixel to pixel basis;
    a third infrared laser camera configured to obtain information on a distance as to the rear side of the vehicle on a pixel to pixel basis; and
    a signal processing portion to which information on images from one or more of the imaging cameras and the information on the distances from one or more of the infrared laser cameras are inputted;
    wherein the parking-assist system provides the parking-assist information according to the information on the images from the one or more of the imaging cameras and the information on the distances as to each pixel from the one or more of the infrared laser cameras.

2. The parking-assist system according to claim 1, which further comprises a recording medium, wherein the parking-assist system records the information on the images from one or more of the imaging cameras and the information on the distances as to each pixel from one or more of the infrared laser cameras on the recording medium when a speed of the vehicle is equal to or less than a predetermined value, initiates a parking-assist operation at the time when a gearshift of the vehicle is put into reverse after the vehicle once stops, and automatically detects a parking position by reversely reproducing the recorded image information and the recorded distance information.

3. The parking-assist system according to claim 2, wherein the parking-assist system performs the automatic detection of the parking position by detecting lines indicating a parking space included in the reproduced image and by distinguishing a spacing between the lines and/or a spacing of the parking space according to the distance information and/or existence/nonexistence of an impediment according to the distance information.

4. The parking-assist system according to claim 3, wherein the parking-assist system performs the detection of the lines by converting the reproduced image into a top-view image, by rotating the top-view image so that the lines may extend vertically on a screen for displaying an image, and by integrating brightness in a direction corresponding to a vertical direction of the screen.

5. The parking-assist system according to claim 2, wherein in order to provide parking-assist information for guiding the vehicle to the automatically-detected parking position, the parking-assist system calculates a proper vehicular running guide route from a present position at which the vehicle stops to the parking position and the screen displays thereon the vehicular running guide route together with an image of the rear.

6. The parking-assist system according to claim 5, wherein the parking-assist system calculates a calculated vehicular running route based on a present rudder angle of a steering wheel of the vehicle, superimposes the calculated vehicular running route on the vehicular running guide route, displays the superimposed routes on the screen, and generates a warning sound and/or displays a warning sign when an amount of a deviation between the vehicular running guide route and the calculated vehicular running route is equal to or more than a predetermined value.

7. The parking-assist system according to claim 6, wherein the parking-assist system calculates a tilting angle of a front wheel of the vehicle according to three-dimensional distance information of the front wheel measured by one of the infrared laser cameras located on the both sides of the vehicle, and determines a central point of the steering wheel by relating the tilting angle of the front wheel to the rudder angle of the steering wheel.

8. The parking-assist system according to claim 1, wherein when the vehicle runs forward, the parking-assist system detects a state of another vehicle approaching the vehicle according to images taken by the imaging cameras located on the both sides of the vehicle and distance information obtained by the infrared laser cameras located on the both sides of the vehicle.

9. The parking-assist system according to claim 1, which further comprises a recording medium for recording an image taken by at least one of the imaging cameras when the vehicle runs forward, wherein the recording medium is configured to be used as a drive-recorder for recording a running state of the vehicle.

10. The parking-assist system according to claim 9, wherein when the recording medium is used as the drive-recorder, the image taken when the vehicle runs forward is image-compressed, is encryption-processed/electronic watermark-processed and is recorded on the recording medium.

11. The parking-assist system according to claim 10, wherein the encryption process when the recording medium is used as a drive-recorder is performed by randomly transposing data corresponding to pixels with using a conversion function for obtaining a top-view image.

12. The parking-assist system according to claim 9, which further comprises an acceleration sensor, wherein when acceleration is detected to be equal to or more than a predetermined threshold by the acceleration sensor, images corresponding to a predetermined period around the time when the acceleration is detected are recorded on the recording medium.

13. The parking-assist system according to claim 9, wherein when a situation is judged to be unsafe according to an image from at least one of the imaging cameras and/or distance information from at least one of the infrared laser cameras, images corresponding to a predetermined period around the time when the situation is judged to be unsafe are recorded on the recording medium.

14. The parking-assist system according to claim 9, wherein the recording medium is water-resistant and capable of recording without contact.

15. The parking-assist system according to claim 3, wherein when the lines are white or yellow the lines are distinguished as indication lines for a parking space.

* * * * *